United States Patent [19]

Ohshima et al.

[11] 3,996,411
[45] Dec. 7, 1976

[54] PRODUCTION OF WATER-SOLUBLE POLYMERS

[75] Inventors: Iwao Ohshima; Seiichi Chiba; Kenzo Ariyama, all of Yokohama, Japan

[73] Assignee: Nitto Kagaku Kogyo Kabushiki Kaisha, Japan

[22] Filed: July 1, 1974

[21] Appl. No.: 484,882

[30] Foreign Application Priority Data

| July 7, 1973 | Japan | 48-76722 |
| Aug. 2, 1973 | Japan | 48-86992 |
| Aug. 2, 1973 | Japan | 48-86993 |

[52] U.S. Cl. ............................ 526/88; 260/29.6 H; 526/62
[51] Int. Cl.$^2$ ..................... C08F 2/10; C08F 20/02
[58] Field of Search ............... 260/29.6 H, 89.7 R; 450/626.6, 89.75, 639; 264/337, 338; 526/62, 88

[56] References Cited

UNITED STATES PATENTS

| 1,809,445 | 6/1931 | Heuck et al. | 260/94.2 |
| 3,332,922 | 7/1967 | Hoover | 260/89.7 |
| 3,405,106 | 10/1968 | Scanley | 260/80 |

FOREIGN PATENTS OR APPLICATIONS

| 481,025 | 2/1952 | Canada |
| 1,317,408 | 5/1973 | United Kingdom |

OTHER PUBLICATIONS

Water–Soluble Polymers, edited by N. M. Bikales, Plenum Press, New York, 1973, p. 216.

*Primary Examiner*—Alan Holler
*Attorney, Agent, or Firm*—Robert E. Burns; Emmanuel J. Lobato; Bruce L. Adams

[57] ABSTRACT

Process for producing a water-soluble polymer comprising polymerizing an ethylenically unsaturated monomer yielding a water-soluble polymer in an aqueous medium in a polymerization vessel, characterized in that the polymerization system is maintained without stirring at least after the polymerization is initiated, the temperature of the polymerization system is permitted to rise on its own accord, and the non-uniformity of temperature distribution between the center and surroundings of the polymerization system due to the temperature rise is eliminated by heating the polymerization system from the outside. The resulting highly viscous aqueous solution of a polymer in the form of a raw rubbery gel can be recovered from the polymerization vessel without causing the polymer solution to stick to the inner wall surface of the vessel and deposit thereon by suitably selecting the relation between the weight of the gel and the adhesion of the gel to the inner wall of the vessel, thereby permitting the gel content to fall from the vessel by its own weight through the opening in the widely opened condition of the vessel.

7 Claims, 3 Drawing Figures

PRODUCTION OF WATER-SOLUBLE POLYMERS

FIELD OF THE INVENTION

The present invention relates to a process for polymerizing ethylenically unsaturated monomers.

A polymer from homogenous polymerization of monomers forming water-soluble polymers in an aqueous medium has different fluidity properties depending on the concentration of the monomers, the degree of polymerization and the composition of the monomers. The present invention is concerned with a process for polymerizing monomers normally forming a hydrogel polymer which is difficult to transport by conventional piping and the post-treatment of the resulting polymer.

An aqueous gel of polymers containing acrylamide is highly adhesive and exhibits a great change in its behavior depending upon the polymer concentration and the degree of polymerization among the ethylenically unsaturated monomers as stated above will be described as an illustrative example.

BACKGROUND

Most water-soluble polymers containing acrylamide have been widely used as paper strengthening agents, water-purification coagulants, dispersing agents, and treating agents in various other applications.

Various methods have been used to polymerize water-soluble monomers containing acrylamide. Among them, the aqueous solution polymerization method has been used in various fields because it is less expensive and convenient and can easily provide a polymer having a high molecular weight which is essential for the coagulant.

In a polymerization method using a solvent or a dispersion medium, such as solution polymerization, the concentration of a monomer or polymer solution is preferably made as high as possible from the standpoints of the capacity of the polymerizing apparatus and removal or drying of the solvent from the resulting polymer solution. However, when solution polymerization is carried out with a high concentration of monomers, other problems arise. That is, the solution is very viscous, which state prevents the substantial stirring required to remove heat of polymerization by contact of the solution with a cooled surface and to maintain a uniform polymerization temperature. Further, due to the very high viscosity of the resulting polymer, removal of the polymer from the polymerization vessel is difficult.

For example, in the production of a high molecular weight polymer capable of being used as a coagulant from a hydrous polymer containing acrylamide, when the concentration of the starting monomer is 10%, or the concentration of the starting monomer is 30%, the polymerization system is already at a viscosity greater than 1,000 cps, ordinarily of 2,000 to 3,000 cps when the concentration of a polymer in the polymerization system becomes 1%, i.e., at an extent of polymerization or conversion of about 10% and about 3.3%, respectively. Under such a high viscosity, a uniform and effective stirring is no longer possible. If the resulting polymer has a super high molecular weight and (or) a high concentration, a raw rubber-like gel having high viscoelasticity is produced. Therefore, it is impossible to discharge and recover the resulting polymer solution from the polymerization vessel as is ordinarily practiced in conventional solution polymerization.

Under these circumstances, a hydrous polymer containing acrylamide produced by the conventional aqueous solution polymerization is expected to have a non-uniform distribution in the degree of polymerization due to non-uniform temperature control. In fact, a conventional high molecular weight polymer containing acrylamide contains some insoluble portions which are considered to result from a partial ultra super high molecular weight polymer, constituting a serious defect for a paper making paste.

Another problem is that even if the polymer produced can be removed from the polymerization vessel, a large amount of the polymer sticks to the inner wall surface of the vessel due to its stickiness and adhesiveness to the wall thereof and other parts. That is, in the case where the resulting polymer solution has a water content as high as 95 to 90%, the polymer solution can be handled as a fluid. However, when the polymer solution is discharged from the polymerization vessel, a large amount of the polymer solution sticks to the inner wall surface of the vessel and remains thereon.

The residue of such a highly viscous polymer solution sticking to the inner wall surface of the polymerization vessel should be avoided for the following points:

i. When the residue of the polymer is washed away prior to the further charge of an aqueous solution of monomers, it requires a large amount of water and a prolonged period of time because the polymer residue is highly viscous.

ii. When an aqueous solution of monomers is charged without washing away the polymer residue, the remaining polymer is dissolved into the monomer solution, increasing the viscosity thereof. Consequently, the operation of expelling of oxygen dissolved in the aqueous monomer solution, which is necessary for a polymerization operation, becomes difficult to effect, and a uniform dispersion of polymerization initiators is inhibited, which leads to the formation of hot spots.

iii. The polymer residue which could not be dissolved in the aqueous solution of monomers absorbs the aqueous solution and swells. The swollen polymer, when subjected to the subsequent polymerization temperature history, may produce a polymer for inferior in solubility. This is because the swollen polymer will probably give rise to the formation of a super high molecular weight polymer or a cross-linked polymer.

SUMMARY OF THE INVENTION

It is an object of the present invention to overcome the aforementioned disadvantages and to provide a water-soluble polymer having a uniform molecular weight. The present invention contemplates achieving the abovementioned object by heating a polymerization vessel rather than cooling it while contacting the highly viscous polymer solution with a cooled surface and effecting polymerization under an adiabatic condition.

Therefore, the process of producing a water-soluble polymer according to the present invention including polymerizing acrylamide-containing monomers capable of producing a water-soluble polymer in the media of an aqueous solution, comprises the steps of maintaining the polymerization system without stirring at least after the polymerization reaction is initiated, leaving the polymerization system to permit its temperature to rise on its own accord and heating the polymerization system from the outside to avoid non-uniformity of temperature distribution between the center and surroundings of the polymerization system due to its temperature rise.

In this manner, the present invention has succeeded in providing a uniform water-soluble polymer while preventing the formation of a polymer having an anomalous molecular weight by conducting the aqueous solution polymerization substantially under a "complete" adiabatic condition without stirring.

Although the polymerization heat is not to be removed, satisfactory results cannot be obtained by merely using no cooling means or using a thermally insulated polymerization vessel.

In these cases, polymerization is apparently carried out under an adiabatic condition, but no perfect adiabatic condition is provided. This is because a practical polymerization reactor has some heat capacity, and the area in contact with or in the neighbourhood of the inner wall surface of the reactor always has a lower temperature than the center portion, even if the temperature of the polymerization system is raised by self-generation of heat. Therefore, in order to provide a fully adiabatic condition while keeping the temperature of the whole polymerization reactor equal to that of the center of the polymerization system, heat must be supplied from outside.

High polymer chemistry teaches that the higher the polymerization temperature the lower is the molecular weight of the resulting polymer. However, in the present invention wherein the temperature of the polymerization system is permitted to rise on its own accord (for example, in aqueous solution-polymerization of acrylamide, when polymerization is carried out under a perfect adiabatic condition at a 20% concentration of the starting monomer, the rise in temperature of the polymerization system amounts to about 60°C, and at the end of the polymerization reaction the polymerization system reaches a temperature of about 80°C. Even if it has a temperature of 20°C at the beginning of the polymerization), and the polymerization vessel is externally heated, a reduction in molecular weight is not particularly observed.

It is another object of the present invention to remove thoroughly rubbery gel polymer having a high elasticity and adhesiveness from the polymerization vessel.

It is known to form the surface of a substrate of a non-adhesive material in order to prevent an adhesive material from sticking to the substrate. Non-adhesive materials of this type include polyolefins such as polyethylene and polypropylene, fluorine-containing resins such as polytetrafluoroethylene and polytrifluorochloroethylene, and the like.

As a matter of fact, results of experiments by the applicants show that the adhesion of an aqueous polyacrylamide solution of a high viscosity prepared beforehand to the surface of polytetrafluoroethylene is very low, and the polymer adhesion problem as stated above does not arise.

However, it was found that when an aqueous solution of polyacrylamide was polymerized in a polymerization vessel whose inner wall surface is composed of a non-adhesive material, the adhesion between the resulting aqueous polyacrylamide solution of a high viscosity and the surface of polytetrafluoroethylene exhibited another phenomena quite different from that just stated above.

That is, when an aqueous polyacrylamide solution of a concentration of about 7% produced in another polymerization vessel is placed in a polymerization vessel lined with polytetrafluoroethylene to examine the adhesion between the inner wall surface of the vessel and the aqueous polyacrylamide of a high viscosity, the polytetrafluoroethylene surface is found to be not wetted at all. In contrast, when an aqueous solution of acrylamide is polymerized in the polymerization vessel with the inner wall surface lined with polytetrafluoroethylene under the same conditions to examine the adhesion between the inner wall surface of the vessel with the resulting aqueous polyacrylamide solution of a high viscosity, the inner wall surface is wetted over the major portions thereof and has a large amount of the polymer adhering thereto even after the aqueous solution is discharged from the vessel.

The present invention contemplates overcoming the above-mentioned difficulties and to recover a highly viscous aqueous solution of polymer in the form of a rubbery gel from the polymerization vessel without causing the polymer solution to stick to the inner wall surface of the vessel and to deposit thereon. In this regard, the present invention contemplates achieving the above-mentioned object by selecting a relation between the weight of the gel and the adhesive force of the gel to the inner wall surface of the vessel and causing the gel content to fall out by its own weight through an opening in a widely opened condition from the vessel thereby to take out the gel.

Accordingly, the process of preparing an acrylamide polymer in accordance with the present invention encompasses the following polymerization process and process for taking out the polymer gel product.

1. Polymerization process

The polymerization process is carried out under the following conditions.

1. An aqueous solution of monomers is subjected to polymerization conditions in a polymerization vessel to produce a substantially non-fluid gel of an aqueous polymer solution.
2. The weight ratio of a monomer to water before polymerization is so selected that the adhesive force between the inner wall surface of the polymerization vessel with which the aqueous monomer solution contacts during the conversion to a gel of the aqueous polymer solution and the gel of the aqueous solution will be less than the tensile stress or shearing stress of the gel of the aqueous polymer solution immediately after completion of the polymerization or an industrial definite time after completion of the polymerization.
3. The polymerization process is carried out under the condition satisfying the following relationship:

$$W > A \times F \tag{1}$$

wherein W represents the weight (kg) of the gel of the aqueous polymer solution in the polymerization vessel, A represents the contact area (m$^2$) between the gel of the aqueous polymer solution and the inner wall surface of the polymerization vessel and F represents the adhesion force (kg/m$^2$) between the gel of the aqueous polymer solution and the inner wall of the polymerization vessel.

2. Polymer recovery process

The content, i.e., the gel of the aqueous polymer solution is allowed to fall by it's own weight and is recovered from the polymerization vessel in a widely opened condition.

More specifically, for example, when the upper end cover of the polymerization vessel is removed, and the vessel is turned upside down at an angle of 90 to 180°, the gel falls "entirely" by its own weight from the large opening formed at the upper portion of the vessel while maintaining substantially the inner contour of the vessel. Alternatively, when the bottom of the vessel is widely opened, the gel similarly falls as a large mass and is recovered. However, when the gel is allowed to fall by its own weight through the large opening of the vessel as stated above, the gel is a mass having a weight corresponding to the volume of the vessel and its weight will amount to 1,000 kg or higher under an industrial operation.

Thus, it is apparent that a container receiving such a large mass is subjected to a large impact for an instant period of time (e.g. in order of 10 millisecond). It is disadvantageous to produce and use such a container having a high resistance to impact on an industrial scale.

It is also an object to overcome the above mentioned problem. In accordance with the present invention, the falling gel is brought into contact with an impact-absorbing member which is able to absorb a part or a substantial part of impact force before it is received by a receptor.

In accordance with the present invention, the falling gel-like hydrous polymer is brought into contact with an impact absorbing member, for example, a cutting member having cutting blades directed upwardly preferably in a hurdle-like arrangement which will be defined later and is passed through the space between the cutting blades while being cut into pieces. Since the impact applied to the cutting member is diffused during the time until the cutting of the gel into pieces is complete (for example, about 20 to 100 milliseconds), the impact which is received by the cutting member itself is reduced to about a half to one tenth. Therefore, the impact to which the receptor is subjected is also reduced to about a half to one tenth due to the reduction in the dropping rate of the gel by its passage through the cutting member and the absorption of the dropping energy by the cutting member.

The cut gel which is to be received by the receptor is, for example, in the form of a square bar 30 to 60 cm long or a plate 30 to 60 cm thick when a hurdle of spacings of 30 to 60 cm is used.

Further, the object of the present invention is not to cut the gel, but to absorb the dropping impact over a relatively long period of time during which the gel passes through the cutting blades, thereby controlling the maximum value of the impact as low as possible.

In this way, in accordance with the present invention the gel of an aqueous acrylamide polymer solution which is the content of the polymerization vessel is allowed to fall by its own weight from the polymerization vessel in a widely opened condition. The term "the polymerization vessel in a widely opened condition" as herein used signifies removing, for example, the upper end cover of a polymerization vessel with a circular drum and tilting the vessel body at an angle of 90 to 180°, or removing the lower end cover, or opening the door of a large opening provided at the bottom. It is unexpected that if the conditions of the present invention are selected the hydrous gel produced by a solution polymerization falls as a whole by its own weight without leaving any residue sticking to the inner wall of the polymerization vessel.

The nature, utility, and further features of this invention will be apparent from the following detailed description beginning with a consideration of general aspects of the invention and concluding with specific examples of practice illustrating preferred embodiments of the invention.

DETAILED DESCRIPTION

1. Polymerization system

The polymerization system is an aqueous solution of one or more acrylamide-containing monomers (usually containing a water-soluble polymerization initiator) similar to that used in a conventional process at the beginning of a polymerization reaction and is converted to a gel of the resulting aqueous polymer solution at the end of the polymerization reaction.

Acrylamide type monomers are well known in the art. Specifically, they include acrylamide and acrylic acid and water-soluble derivatives thereof (methylol compounds, salts, esters and the like).

Among them, an acrylamide monomer is the most typical. The term "acrylamide monomer" as herein used designates, in addition to acrylamide ($CH_2 = CHCONH_2$), single $\alpha$- or $\beta$- or N-substituted acrylamide derivatives, or mixtures thereof or with a minority of other water-soluble monomers which have a water solubility sufficient to provide an aqueous solution of monomers with a desired concentration and an aqueous solution of the resulting polymer. Illustrative examples of such acrylamide derivatives include methacrylamide, N-methylolacrylamide, and N-methylolmethacrylamide. Illustrative examples of the monomer mixtures include a mixture of acrylamide and methacrylamide, a mixture of acrylamide and methylolacrylamide, and mixtures of a predominant quantity (above 50% by weight) of the above-mentioned acrylamide or acrylamide derivatives and other water-soluble monomers such as acrylic acid or salts thereof, methacrylic acid or salts thereof, hydroxyl alkyl (e.g. ethyl or propyl) esters of acrylic or methacrylic acid, acrylonitrile, methacrylonitrile, lower alkyl (not more than four carbon atoms) esters of acrylic acid.

2. Polymerization

Stirring

To ensure that a solution polymerization initiator is uniformly dispersed throughout a polymerization system, stirring is usually carried out until a polymerization reaction is started.

In the present invention, when the polymerization reaction is once started (which may be detected by the increased temperature or viscosity of the polymerization system), stirring is no longer carried out. When the concentration of the polymer is about 5%, the polymerization system becomes highly viscous, rendering a practical stirring impossible also.

The stirring may be conducted by means of a conventional device.

Thermal condition

The polymerization system is brought to increased temperatures by the heat of polymerization. In the present invention, this spontaneous rise in temperature is left as it is.

According to the present invention, the non-uniformity of temperature distribution between the center and periphery of the polymerization system is corrected by heating the polymerization system from the outside.

The external heating of the polymerization system may be carried out by bringing a vessel accommodating the polymerization system (which vessel is not necessarily made of a metal and may be a bag made of a plastic film) into contact with an appropriate heating medium. The heating medium may be a fluid medium such as a gas or liquid (steam or hot water) or a particulate solid. It may be also an electrically heating wire, steam coil or other fixed heat source. Further, "the external heat from the polymerization system" does not necessarily mean heating from the outside of the polymerization vessel. Heating by heating means provided closely to the inner wall surface is one embodiment of the heating from outside of the polymerization system according to the present invention.

The degree of heating should be sufficient to offset the escape of heat outside of the system occurring together with the spontaneous rise in temperature of the polymerization system.

More specifically, a voltage supplied to a nickel-chromium wire disposed closely to the inner wall surface and/or external wall surface of the polymerization vessel may be increased by means of a slide transformer so as to prevent a thermometer fitted to the inner wall surface of the polymerization vessel from indicating a temperature below the maximum temperature of the polymerization system. Another method includes covering the whole outer surface of the polymerization vessel with a jacket, circulating warm or hot water through the jacket and controlling the temperature of the circulating water to a temperature (which is usually higher by several degree than the maximum temperature of the polymerization system and can be determined by a simple calculation) necessary and sufficient to maintain a complete adiabatic condition of the polymerization system.

Other polymerization conditions

The polymerization process according to the present invention is substantially similar to a process of polymerizing ethylenically unsaturated monomers, particularly an acrylamide monomer in an aqueous medium except for non-stirring of the polymerization system, non-interference of the spontaneous rise in temperature of the polymerization system and external heating.

The polymerization of an acrylamide monomer in an aqueous medium, that is, the aqueous solution polymerization is known per se. Therefore, the conventional knowledge may be used so long as it does not depart from the spirit of the present invention. "An aqueous medium" may also contain a small amount of organic solvents.

The preferred initiators usable in the process of the present invention are water-soluble azo compounds such as 2-cyano-2-propylazoformamide, 2,2'-azobis(2-amidinopropane)hydrochloride, 4,4'-azobis(-cyanovalerianic acid). The use of these initiators provides a very good reproducibility of polymerization and causes no formation of an abnormal polymer which is one of the causes for insolubilization occurring in pulverizing the resulting polymer. In the process of the present invention, other catalysts such as a water-soluble peroxide-water-soluble tertiary amine system, a water-soluble peroxide-water-soluble sulfite system and a water-soluble bromate-water-soluble sulfite system may, of course, be used.

In the practice of the present invention, the concentration of monomers in an aqueous solution is selected at any value above about 3% by weight. Also, when the gel is allowed to fall by its own weight, a higher concentration, for example, no less than about 18% by weight is used in order to impart strength to the gel itself. In practical uses, the concentration is preferably of the order of about 5 to about 30% by weight.

As previously stated, the monomers which may be polymerized are any water-soluble monomer mixtures of acrylamide and water-soluble monomers copolymerizable with acrylamide, such as acrylic acid, acrylates and acrylonitrile as well as acrylamide alone. The starting temperature of polymerization may be suitably selected.

The acrylamide polymer thus produced has a molecular weight of the order of from 5,000,000 to 15,000,000.

3. Gel removal condition

It is impossible to quantatively define conditions for taking out the gel because they depend upon the shape and construction of the given polymerization vessel. Furthermore, the adhesion force between the resulting gel and the inner wall surface of the vessel is one developed when the inner wall is contacting the polymerization system during the formation of the gel, and therefore, the value of the adhesion force must be determined by experiments. Accordingly, this value also cannot be determined in a simple way.

However, there is certainly present a weight ratio of acrylamide monomer to water before polymerization, wherein the adhesion force between the resulting gel and the inner wall surface of the polymerization vessel is less than the tensile stress or shearing stress of the gel and a condition satisfying the following relation $$W > A \times F$$

wherein W denotes the weight (kg) of the gel in the polymerization vessel, A denotes the contact area ($m^2$) between the gel and the inner wall surface of the polymerization vessel, and F denotes the adhesion force ($kg/m^2$) between the gel and the inner wall surface of the polymerization vessel. This condition may be easily determined by a simple experiment.

4. Polymerization vessel

The polymerization vessel may be a conventional vessel of such a construction that the gel of the content falls by its own weight when the vessel is in a widely opened condition.

A typical polymerization vessel is one having a cylindrical drum with a diameter of the lower portion less than that of the upper portion and a construction such that an upper dished cover (an agitator, a thermometer, a pipe for blowing an inert gas for driving off dissolved oxygen and other auxiliary devices are preferably installed within this cover) can be removed, and the vessel can be inverted through an angle of 90 to 180°. If the vessel is turned upside down, an opening having a size corresponding to the diameter of the drum is formed. Such a polymerization vessel is substantially the same as that conventionally used except that it is designed to be turned upside down.

Another concrete example is a polymerization vessel of a construction having a cylindrical drum with a diameter of the upper portion less than that of the lower portion and a large opening capable of being freely opened and closed at the bottom thereof. When the opening is opened, the gel within the vessel falls by its own weight.

Alternatively, a large opening may be provided on the side of the polymerization vessel. In this case, the content is allowed to fall as a whole by turning the vessel to an appropriate angle.

Coating of the interior of the polymerization vessel with non-adhesive materials is preferable in order to reduce the adhesion between the gel and the inner wall as much as possible (although such a coating cannot prevent the adhesion of the gel as stated above), and it is peferred that projections such as a thermometer are reduced to a minimum. Furthermore, the polymerization vessel is preferably provided with a slip slope in the direction of the gel discharge (for example, if the gel is discharged at the top of the vessel, the diameter of the drum of the vessel is made larger at its upper portion than that at its lower portion).

As previously stated, stirring is practically impossible once the polymerization reaction is started. Therefore, in the case where an aqueous acrylamide solution stirred after the addition of a polymerization initiator can be rapidly supplied into the polymerization vessel or a polymerization initiator having a long induction period is used, the acrylamide solution can be introduced into the polymerization vessel after it has been stirred in a certain vessel other than the polymerization vessel to achieve a uniform distribution of the polymerization initiator. Therefore, it is also possible to omit the agitator in the polymerization vessel.

5. Taking out process

Taking out the gel

As previously stated, a large opening is formed at the top, bottom or side of the polymerization vessel. For example, in the case where a large opening is formed at the top, the top dished cover is removed and the vessel as a whole is then turned upside down through an angle of 90 to 180°, thereby permitting the gel to fall out by its own weight.

Separation of gel from the agitator and the like

If projections such as a thermometer and an inert gas blowing pipe in a polymerization vessel are not large in size, it is possible for the gel to drop out by its own weight in spite of their presence (the afore-mentioned A and F are contact area and adhesion force, respectively, which are defined with due regard to these factors).

However, in the case where large projections such as an agitator are installed in the vessel, separation of the gel from these projections may be analyzed as follows.

It will be supported that the contact areas between the auxiliary devices such as an agitator, thermometer, an inert gas blowing pipe, and the like installed in the polymerization vessel and a gel of an aqueous acrylamide polymer solution are $A_1, A_2, A_3, \ldots$, respectively; the adhesion forces between these devices and the gel are $F_1, F_2, F_3, \ldots$, respectively; the projection areas of these devices with respect to the direction of drawing when these devices are drawn out from the gel are $a_1, a_2, a_3, \ldots$, respectively; and the resisting force to which these devices are subjected during their passing through the gel at a definite rate while eliminating the gel corresponding to the respective projection planes are $f_1, f_2, f_3, \ldots$, respectively. The gel can be separated from the instruments by virtue of the weight W of the gel per se or the upward force corresponding to W, provided that there is present the following relationship between the weight W of the gel and the above mentioned factors:

$$W > A_1 \times F_1 + A_2 \times F_2 + A_3 \times F_3 + \ldots + a_1 \times f_1 + a_2 \times f_2 + a_3 \times f_3 + \ldots \qquad (2)$$

Accordingly, when the upper end cover is provided with an agitator and the like, the polymerization process is effected in such a manner as to satisfy the above-mentioned condition (2) and the afore-mentioned condition (1) with respect to the drum of the polymerization vessel, and, thereafter, the end cover is drawn upwards (or the drum of the vessel is drawn downwards) and the drum is then turned upside down through an angle of 90 to 180° to remove the end cover, after which the gel may be discharged through a large opening formed at the upper portion of the vessel or it may be discharged through the bottom in a widely opened condition. In the case where the bottom of the polymerization vessel is widely opened, the polymerization process may be effected in such a manner as to satisfy the condition (1) based on the consideration of the condition (2) because the end cover need not be removed.

The contact area A between the gel of the aqueous acrylamide polymer solution and the inner wall surface of the polymerization vessel as herein used is not a geometrical total area. When the gel is to be drawn out from the polymerization vessel, a uniform "separating force" does not necessarily act between the wall of the vessel and the gel in contact with (adhering to) the wall, and "pushing force" partially acts in some cases because the gel has a viscoelasticity and is transformed under the influence of any exterior force. Accordingly, it will be seen that the quantity A as herein defined denotes an integral of microareas or microlines about to be peeled off. When such an integral of microareas or microlines is designated A, it will be apparent that the value is always less than the geometrical contact area.

Similarly, the weight W of the gel serving to act as a motive force to cause a peeling phenomena should not be understood as being a physical weight itself. The weight W should be understood as an integral of peeling force acting on the microareas or microlines about to be peeled. If the "perfect" separation of the gel mass by its own weight is analyzed per microtime, it can be easily conceived that the peeling starts from the microareas or microlines on which a peeling force is strongly applied and finally develops throughout the whole adhering surface.

6. Impact absorbing member

The impact absorbing member comprises at least one cutting blade, preferably a plurality of cutting blades, with their edge arranged upward. In the case where a plurality of cutting blades are used, they are arranged in the form of a hurdle.

The term "cutting blade" as herein used does not necessarily signify a member with a keen edge, but any member serving to cut the falling gel mass when it collides therewith. Therefore, cutting blades may be typically in the form of a plate, preferably a wedge in cross section, although it may be also of a rod shape or any other shape in cross section.

The cutting member comprises cutting blades with their edges arranged upwardly, preferably in the form of a hurdle. The term "edge arranged upward" as herein used means that, in the case of a plate-shaped cutting blade, the plate is so arranged that the direction of the plate thickness is horizontal or that, in the case of a cutting blade having a wedge-shaped cross section, the edge correspondng to the acute angle of a wedge is arranged upward. The term "edge arranged in the form of a hurdle" as herein used means arranging of a plurality of cutting blades in parallel or in crossing arrangement (for example, in the form of a lattice). In the case of a plurality of cutting blades, the distance between the blades is determined by the consistency or viscoelasticity, weight or dropping rate of the gel. Ordinarily, this spacing distance is of the order of 10 cm to 50 cm. Further, the cutting member must, of course, have sufficient strength.

7. Receptor

The receptor may be of any construction. It need only be resistant to the impact force of the cut falling gel (which impact force is reduced to a value of one half or one third to one twentieth or one thirtieth of that produced when the cutting member is not used) and have a capacity sufficient to accommodate the gel.

EXPERIMENTAL EXAMPLES

Example 1

Apparatus

A steel polymerization vessel lined with glass and having an internal volume of about 20 l, which was provided with a warm water circulating jacket at the major portions of its drum and bottom, was provided at its upper lid with an agitator, three thermometers (the sensors thereof being positioned at approximately the center of the vessel, a point about 1 cm from the surrounding wall of and an vessel and approximate intermediate point between these two points), an inlet for an aqueous solution of monomers and the like, an opening for a nitrogen blowing nozzle intended for driving off dissolved oxygen in the aqueous solution of monomers, and a degassing opening.

The jacket was provided with an inlet and an outlet for warm water which were connected to a piping for circulating warm water adjusted to a predetermined temperature by means of a pump from a separately arranged reservoir of warm water. The reservoir was provided with a thermometer, a steam blowing silencer for increasing temperature, piping for supplying cooling water, and an agitator.

Polymerization

A commercially available industrial acrylamide was purified by recrystallization with ion-exchanged water, and the resulting crystals in wet state were dissolved in ion-exchanged water to prepare 20 kg of a 20% (by weight) aqueous solution of acrylamide. The aqueous acryamide was then charged into a polymerization vessel and adjusted to a temperature of 30° C with warm water circulating through the jacket while being stirred, and while nitrogen gas was blown thereinto. This operation was continued for a period of about 30 minutes. At this time, the temperature of warm water circulating through the jacket was about 30° C and kept subsequently at that temperature. Separately, as a polymerization initiator a solution of 600 mg of reagent grade potassium persulfate in 30 ml of ion-exchanged water and a solution of 1,400 mg of reagent grade nitrilotrispropionamide in 30 ml of ion-exchanged water were successively poured into the aqueous acrylamide solution. Nitrogen blowing was stopped about 5 minutes after the addition of the polymerization initiators. The three thermometers indicated a rise in temperature about 9 to 10 minutes after the addition of the polymerization initiators, which indicated the initiation of polymerization. At this point, the agitation was stopped.

The temperature of the polymerization system gradually rose at the very beginning of polymerization and then rose rapidly.

To ensure that the polymerization system was kept in as complete an adiabatic condition as possible, the volume of steam supplied into the reservoir of warm water was adjusted while the indication of the thermometer positioned at the center of the polymerization system was read. The relation between the temperature and the time in the respective position during polymerization is shown in the following table.

| Elapsed Time After Addition of Polymerization Initiators (minute) | Temperature at Center part (° C) | Temperature at Circumferential Wall part (° C) | Temperature at Middle part (° C) | Temperature of Warm Water (° C) | Note |
|---|---|---|---|---|---|
| 0 | 30 | 30 | 30 | 30 | |
| 5 | 30 | 30 | 30 | 30 | Stopped blowing in of nitrogen |
| 9 | 30 | 30 | 30 | 30 | |
| 10 | 30 | 30 | 30 | 30 | Stopped agitation |
| 12 | 31 | 30 | 31 | 30 | |

-continued

| Elapsed Time After Addition of Polymerization Initiators (minute) | Temperature at Center part (° C) | Temperature at Circumferential Wall part (° C) | Temperature at Middle part (° C) | Temperature of Warm Water (° C) | Note |
| --- | --- | --- | --- | --- | --- |
| 15 | 31 | 31 | 31 | 31 | |
| 20 | 32 | 31 | 32 | 31 | |
| 25 | 37 | 36 | 37 | 39 | |
| 30 | 44 | 43 | 45 | 58 | |
| 35 | 55 | 55 | 56 | 67 | |
| 40 | 68 | 67 | 67 | 89 | |
| 45 | 85 | 83 | 84 | 92 | |
| 50 | 90 | 89 | 89 | 94 | |
| 55 | 91 | 90 | 91 | 94 | |
| 60 | 91 | 91 | 91 | 94 | |
| 65 | 91 | 92 | 91 | 94 | Polymerization completed |

Properties of the polymer

Immediately after the completion of the polymerization, the upper lid was removed and the agitator, the thermometers, and the nozzle for blowing nitrogen gas were then removed from the polymerization system. The resulting polymer was a raw rubbery elastomer. In preparing a sample, a predetermined amount of the polymer was cut off from the polymerization vessel and sampling was effected at the center of the polymerization system, a portion between the wall of the vessel and a point 1 cm away therefrom, and an intermediate portion between these two positions. These samples collected are referred to as the center sample, the wall sample and the intermediate sample, respectively.

Each sample (raw rubbery polymer) was taken as a small mass weighing 25 gr which was placed in a 500 cc glass beaker, to which 475 g of ion-exchanged water was added and the resulting mixture was charged with stirring into a solution.

On the other hand, each sample was cut in to fine particles having a size of about 3 to 4 mm and these particles were dried with hot air at a temperature of 60° C for 14 hours.

In the case where the acrylamide polymer is dried, drying is not ordinarily carried out to such an extent that the volatile content (consisting of a major portion of water) is reduced substantially to an infinitesimal quantity. Even if some volatile content (usually, of the order of 10% by weight) is left, the polymer can be said to be in a dried state provided that it may be handled in pulverizing and storing as a substantial dry product. Ordinarily, it is very difficult to remove the water content from an acrylamide polymer with analytical accuracy in industrial practice.

The resulting dry particles were pulverized and screened to obtain particles having a size of 42 to 60 mesh (Tyler standard sieve). These particles were used respectively as three kinds of dry sample.

5 g of each dry sample was dispersed in 495 g. of ion-exchanged water placed in a 500 cc glass beaker and dissolved thereinto while being stirring.

The dissolving operation was continued for 20 hours with the raw rubbery polymer (polymerization sample) and for 6 hours with the dry sample.

After the dissolving operation over the stated period, each solution was filtered with a 24-mesh sieve to measure the amount of undissolved matters remaining on the sieve in order to determine the state of dissolution. However, all the samples were satisfactorily uniformly dissolved and produced no undissolved substances.

Prior to the filteration test, each of these solutions were subjected to a viscosity determination. The results were as follows:

| Portion | Polymerization sample | Dry sample |
| --- | --- | --- |
| Center | 2,300 CPS | 1,900 CPS |
| Surrounding wall | 2,400 | 1,950 |
| Intermediate | 2,400 | 1,900 |

The viscosity was determined at a temperature of 25° C and at a rotational speed of 6 rpm with the use of a No. 2 rotor in a BM type viscometer.

Comparative Example 1

Through the use of the same apparatus as in Example 1, polymerization was carried out in the same manner except that warm water was circulated through the jacket of the polymerization vessel only to adjust the temperature of the content of the vessel and was subsequently removed from the jacket prior to the addition of a polymerization initiator, and the polymerization was carried out while the jacket was maintained substantially empty.

The relationship between the temperature of each part (which is indicative of the polymerization condition) and time is shown in the following table.

| Elapsed time after Addition of Polymerization Initiator (min) | Temperature at Center Part (° C) | Temperature at Circumferential Wall Part (° C) | Temperature at Middle Part (° C) | Note |
| --- | --- | --- | --- | --- |
| −3 | | | | Extraction of warm water in the jacket |
| 0 | 30 | 30 | 30 | Addition of polymerization initiator |

-continued

| | | | | |
|---|---|---|---|---|
| 5 | 30 | 30 | 30 | Discontinue of nitrogen gas-blowing |
| 10 | 30 | 30 | 30 | |
| 12 | 30 | 30 | 30 | |
| 15 | 30 | 30 | 30 | Discontinue of agitation |
| 20 | 32 | 31 | 32 | |
| 25 | 36 | 34 | 35 | |
| 30 | 42 | 37 | 41 | |
| 35 | 53 | 44 | 51 | |
| 40 | 66 | 51 | 65 | |
| 45 | 85 | 60 | 83 | |
| 50 | 89 | 68 | 87 | |
| 55 | 90 | 74 | 89 | |
| 60 | 91 | 79 | 90 | |
| 65 | 91 | 83 | 90 | |
| 70 | 91 | 85 | 90 | Completion of polymerization |

Processing after polymerization

Following the same procedure as in Example 1, polymerization samples and dry samples were prepared and their dissolubility and viscosity were determined. The results are shown in the following table.

| | Polymerization sample | | Dry sample | |
|---|---|---|---|---|
| Portion | Viscosity (CPS) | Condition of dissolution | Viscosity (CPS) | Condition of dissolution |
| Center | 2,350 | uniform | 1,900 | uniform |
| Surrounding wall | 3,100 | uniform | 2,400 | Several tens of a swollen gel-like matter remained |
| Intermediate | 2,400 | uniform | 2,000 | uniform |

Example 2

An inverted frustoconical polymerization vessel having an internal volume of about 10 l, a diameter of 18 cm at the bottom, a diameter of 28 cm at the upper portion and a height of 25 cm with an interior wall surface lined with tetrafluoroethylene and an insulated exterior wall which was made of stainless steel was used.

8 kg of a 24% (by weight) aqueous solution of acrylamide was charged into the vessel, and the dissolved oxygen in the solution was satisfactorily driven off by means of a stream of nitrogen. During this operation, the temperature of the solution was adjusted to 25° C. Then, as a polymerization initiator, a solution of 0.96 g of nitrilotrispropionamide in 50 ml of water and a solution of 0.48g of potassium persulfate in 50 ml of water were successively added to the acrylamide solution. Mixing of the polymerization initiators into the aqueous acrylamide solution was carried out by passing nitrogen through the solution. After about 11 minutes from the addition of the polymerization initiator, the viscosity of the system increased, which indicated the initiation of polymerization. At this point, the flow of nitrogen was stopped.

The rise in temperature of the system ceased about 90 minutes after the beginning of polymerization, which indicated the completion of polymerization. At this point, the temperature of the system reached 95° C. After completion of polymerization, the lid of the vessel was removed and the vessel was turned upside down through 180°. At about 4 minutes thereafter, the content in the vessel had fallen out entirely (the polymer was a raw rubbery gel having a very high viscoelasticity).

Example 3

A steel polymerization vessel having an internal volume of about 88 l, a diameter of 38 cm at the bottom, a diameter of 48 cm at the upper portion and a height of 55 cm with a interior wall surface lined with polyethylene and an insulated exterior wall was used. The specification of the monomers and the like charged into the polymerization vessel was as follows:

| | |
|---|---|
| Acrylamide | 11.4 kg |
| Acrylic acid | 2.3 kg |
| Ion-exchanged water | 45.0 kg |
| Caustic soda | about 1.3 kg |

The solution charged was adjusted to a pH value of 6.5. The solution was adjusted to a temperature of 30° C while the dissolved oxygen was driven off by passing nitrogen through the solution.

As a polymerization intiator, 12.0 g of nitrilotrispropionamide and 6.0 g of potassium persulfate were dissolved in 250 ml of ionexchanged water, respectively, and the resulting solutions were added to the vessel in order. The resulting mixture was agitated by passing a stream of nitrogen through the vessel.

The polymerization was carried out by conventional procedure, and the polymerization system reached a temperature of 95° C. The polymerization system produced a gel containing bubbles and an apparent volume about 5% higher than that before polymerization. The lid of the vessel was removed and the vessel was turned upside down through 180°. At about 80 seconds after the inversion, the polymer gel had fallen out entirely from the vessel. At the inner wall of the vessel, no gel-like adhering substance was observed except for a small amount of water droplets and some viscous water membrane containing a small amount of the polymer dissolved in the water droplets.

Comparative Example 2

Following the same procedure described in Example 2, polymerization was carried out in the same polymerization vessel as in Example 2 except that the vessel was provided with no polytetrafluoroethylene liner. When the vessel was turned upside down, the gel could not fall out by its own weight.

Comparative Example 3

Using the same polymerization vessel described in Example 2, the polymerization reaction was carried out according to the same procedure as in Example 2 except that an aqueous acrylamide solution having a concentration of 8% was used, and the temperature before polymerization was adjusted to 35° C. In this case, the rate of polymerization was so low that it took about 6 hours for completion of polymerization which was determined by a rise in temperature of the polymerization system. The resulting polymer was a highly viscous fluid of the state of honey.

When the vessel content was discharged by turning the vessel upside down upon completion of polymerization, most of the content flowed out. However, the polymer of a thickness of 1 to 2 cm remained adhering to the wall of the vessel throughout about two thirds of the area thereof.

Reference Experiment

The polymer produced in Comparative Example 3 was passed into a polymerization vessel (container) of the same material and shape as these in Comparative Example 3 and left for several hours to bring the polymer into intimate contact with the wall surface of the vessel. Subsequently, when the vessel was turned upside down, the polymer contained therein immediately fell out entirely without leaving polymer adhering to the inner wall surface of the vessel.

Example 4

Figure 1:
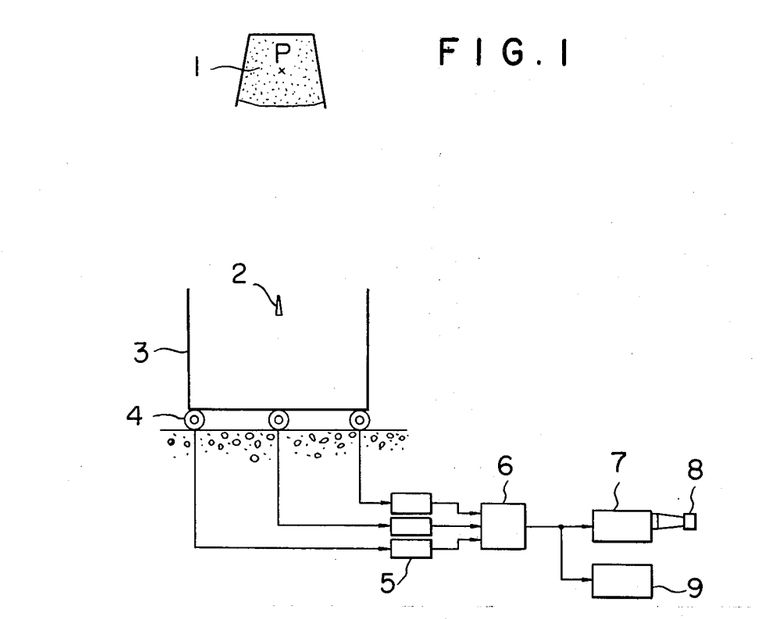
FIG. 1 is a schematic diagram indicating the general and essential organization of apparatus suitable for measuring impact forces; wherein an impact absorbing member 2 is mounted on the upper portion of a side wall of a receptor 3.

The process of the present invention was evaluated by determining impact force exerted by the falling polymer gel by using an apparatus as illustrated in FIG. 1. In FIG. 1 reference numeral 1 designates a polymer gel whose center of gravity is indicated approximately at P point. A cutting blade 2 for absorbing impact is disposed above a receptor 3 supported on load converters 4 for determining impact load each comprising a load cell using a strain gauge. Each load cell is fastened at one of three points of the receptor 3 and is mounted on a strong concrete base. Amplifier-converters 5 produce direct currents proportional respectively to the loads to which the load cells are subjected. An adder 6 produces the total of the outputs from the three amplification converters and feeds a signal corresponding to this total to a Braun tube ocilloscope 7 provided with a camera 8 and also to a high speed pen-writing recorder 9.

An experiment was carried out using a cutting blade with its blade set upward the blade having an edge angle of about 15°, a width of about 11 cm, and a length of about 100 cm.

The results obtained when the gel was allowed to fall are shown in the following table. The symbols in the table are as follows.

W : Weight of the gel body
H : Height from the bottom of the receptor to the center of gravity of the gel body
S : Impact force applied to the receptor (including the cutting blade)
$\theta$ : Period from the time when impact force begins to be applied on the receptor until the time it reaches its maximum value.

Figure 2:
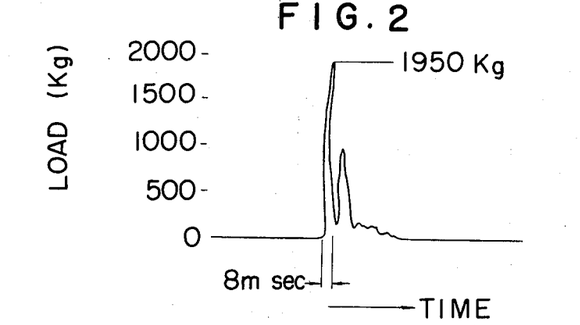
FIG. 2 is a graph indicating an example of recording of a reference experiment, corresponding to Experiment No. 1.
Figure 3:
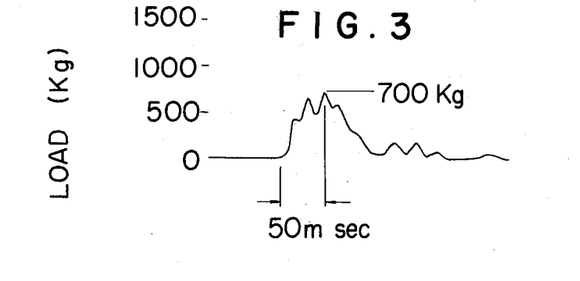
FIG. 3 is a graph indicating an example of recording of an experiment of this invention, corresponding to Experiment No. 6 wherein the waves appearing during about 50 m sec before impact force reaches its peak at 700 kg, which are shown on the left side of the peak wave in this figure, indicate impact force applied to the impact absorbing member 2 during the period from the moment when the gel collides with said impact absorbing member until it slides off said member completely, and the low waves appearing thereafter which are shown on the right side in this figure indicate impact force applied to the receptor 3 when the gel reaches the bottom thereof.

| Run No. | | W | H | S | $\theta$ |
|---|---|---|---|---|---|
| 1 | | 50 kg | 3.0$^m$ | 1,950 kg | 8 msec |
| | Comparative experiment | | | | |
| 2 | | 70 | 2.7$^5$ | 2,050 | 7 |
| | No cutting edge | | | | |
| 3 | | 50 | 2.9 | 2,000 | 4 |
| 4 | | 50 | 2.9 | 6,300 | 2 |
| 5 | | 70 | 2.7$^5$ | 5,100 | 4 |
| 6 | | 50 | 2.9 | 700 | 50 |
| | This invention | | | | |
| 7 | | 65 | 6.0 | 2,700 | 30 |
| | One cutting edge | | | | |
| 8 | | 50 | 2.9 | 700 | 22 |

What we claim is:
1. A batchwise process for obtaining a hydrogel of a substantially non-fluid water-soluble acrylic polymer by subjecting an aqueous solution containing at least 10% by weight of an acrylic monomer or a mixture of an acrylic monomer with a water-soluble monomer copolymerizable therewith to polymerization to form a hydrogel mass in a polymerization vessel which has an opening wide enough to discharge the mass of the resultant hydrogel therethrough as a whole, the opening being closed during the polymerization but being opened after the polymerization, and in which the mass of hydrogel is unagitated and remains stationary with respect to the polymerization vessel during polymerization and the temperature of the mass of hydrogel is permitted to rise due to the heat of polymerization, and by discharging the mass of hydrogel from the polymerization vessel through the opening, which process comprises allowing the mass of hydrogel (a) to fall through the opening down into a receptor disposed under the opening, thereby discharging same out of the polymerization vessel and (b) to collide, before the mass of hydrogel is received by the receptor, with rigid bar means disposed between the opening and the receptor whereupon the mass of hydrogel is split by said bar means during the course of falling and colliding, undergoes a frictional travel, the friction being between the bar means and the mass of hydrogel, whereby a part of impact force is absorbed through the frictional travel.

2. The process according to claim 1 wherein the acrylic monomer is at least one monomer selected from the group consisting of acrylamide, $\alpha,-\beta-$ or N-substituted acrylamide, acrylic acid and hydroxy lower alkyl esters of acrylic or methacrylic acid.

3. The process according to claim 1 wherein said acrylic monomer is acrylamide.

4. The process according to claim 1 wherein the polymerization is carried out at a concentration of the monomer of from 10 to 30% by weight.

5. The process according to claim 1 wherein the polymerization is carried out at a monomer concentration of from 18% to 30% by weight.

6. The process according to claim 1 wherein said bar means consists of at least one bar disposed perpendicular to the direction of said falling mass of hydrogel.

7. The process according to claim 1 wherein the polymerization vessel is heated from the outside thereof thereby to minimize non-uniformity of the temperature distribution across the center and the peripheral part of the mass of hydrogel in the vessel.

* * * * *